United States Patent
Brok et al.

(10) Patent No.: US 7,758,673 B2
(45) Date of Patent: Jul. 20, 2010

(54) PROCESS FOR REMOVING CARBON DIOXIDE FROM GAS MIXTURES

(75) Inventors: Theodorus Johannes Brok, Amsterdam (NL); Rudolf Johannes Mathilda Groenen, Amsterdam (NL); Jeanine Marie Klinkenbijl, Amsterdam (NL); Mariette Catharina Knaap, Amsterdam (NL)

(73) Assignee: Shell Oil Company, Houston, TX (US)

( * ) Notice: Subject to any disclaimer, the term of this patent is extended or adjusted under 35 U.S.C. 154(b) by 831 days.

(21) Appl. No.: 10/501,240

(22) PCT Filed: Jan. 14, 2003

(86) PCT No.: PCT/EP03/00338

§ 371 (c)(1),
(2), (4) Date: Mar. 30, 2005

(87) PCT Pub. No.: WO03/057348

PCT Pub. Date: Jul. 17, 2003

(65) Prior Publication Data

US 2005/0166756 A1    Aug. 4, 2005

(30) Foreign Application Priority Data

Jan. 14, 2002   (EP)   ................... 02075133

(51) Int. Cl.
*B01D 53/14*   (2006.01)
*B01D 53/34*   (2006.01)
*C01B 17/16*   (2006.01)
*C01B 31/20*   (2006.01)
*C10G 29/22*   (2006.01)

(52) U.S. Cl. ............................ 95/235; 95/191; 95/236; 95/159; 95/230; 95/178; 423/228; 423/226; 423/229; 208/207; 208/240; 585/833

(58) Field of Classification Search ................. 95/236, 95/235, 191; 423/228–229, 226; 208/207, 208/240
See application file for complete search history.

(56) References Cited

U.S. PATENT DOCUMENTS

| 4,336,233 | A | * | 6/1982 | Appl et al. | ................... 423/228 |
| 4,705,673 | A | * | 11/1987 | Capobianco et al. | ......... 423/226 |
| 4,997,630 | A | * | 3/1991 | Wagner et al. | ............... 423/228 |
| 5,820,837 | A | | 10/1998 | Marjanovich et al. | ....... 423/220 |
| 6,102,987 | A | | 8/2000 | Gross et al. | .................... 95/172 |
| 6,337,059 | B1 | * | 1/2002 | Schubert et al. | ............. 423/210 |
| 6,436,174 | B1 | * | 8/2002 | Grossmann et al. | ........... 95/191 |
| 7,276,153 | B2 | * | 10/2007 | Wagner et al. | ............... 208/240 |
| 2003/0141223 | A1 | * | 7/2003 | Wagner et al. | ............... 208/312 |
| 2004/0036055 | A1 | * | 2/2004 | Asprion et al. | ............... 252/180 |

FOREIGN PATENT DOCUMENTS

| CA | 1128203 | 7/1982 |
| GB | 1589231 | 4/1978 |
| GB | 2017524 | 10/1979 |
| JP | 61271016 | 11/1986 |
| WO | WO0000271 | 1/2000 |
| WO | 00/66249 | 11/2000 |

OTHER PUBLICATIONS

International Search Reported dated May 12, 2003.
A.L. Kohl, et al, Gas Purification, 2nd edition, Gulf Publishing Co., Houston and R.N. Maddox, 1974, Gas and Liquid Sweetening, Campbell Petroleum Series.

* cited by examiner

*Primary Examiner*—Frank M Lawrence
*Assistant Examiner*—Ives Wu
(74) *Attorney, Agent, or Firm*—Charles W. Stewart

(57) ABSTRACT

The present invention relates to a process for removing carbon dioxide and optionally hydrogen sulphide and/or COS from a gas stream containing these compounds by washing the gas with an aqueous washing solution containing water, sulfolane and a secondary or tertiary amine derived from ethanolamine. More particularly the invention relates to the process described above, the process being carried out in the presence of a primary or secondary amine compound in an amount between 0.5 and 15 wt. % based on water, sulfolane and amine. The invention further relates to an absorbent liquid to be used in the above process.

15 Claims, No Drawings

PROCESS FOR REMOVING CARBON DIOXIDE FROM GAS MIXTURES

The present invention relates to a process for removing carbon dioxide and optionally hydrogen sulphide and/or COS from a gas stream containing these compounds by washing the gas with an aqueous washing solution containing water, sulfolane and a secondary or tertiary amine derived from ethanol amine. The invention further relates to an absorbent liquid to be used in the above process.

The use of organic solvents or aqueous solutions of organic solvents for removing of so-called acidic gasses as carbon dioxide and optionally hydrogen sulphide and/or COS from a gas stream containing these compounds has been described long ago. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series. Preferably a regenerable absorbent solvent is used in a continuous process.

On an industrial scale there are chiefly two categories of absorbent solvents, depending on the mechanism to absorb the acidic components: chemical solvents and physical solvents. Each solvent has its own advantages and disadvantages as to features as loading capacity, kinetics, regenerability, selectivity, stability, corrosivity, heat/cooling requirements etc.

Chemical solvents which have proved to be industrially useful are primary, secondary and/or tertiary amines derived alkanolamines. The most frequently used amines are derived from ethanolamine, especially monoethanol amine (MEA), diethanolamine (DEA), triethanolamine (TEA), diisopropanolamine (DIPA) and methyldiethanolamine (MDEA).

Physical solvents which have proved to be industrially suitable are cyclo-tetramethylenesulfone and its derivatives, aliphatic acid amides, N-methylpyrrolidone, N-alkylated pyrrolidones and the corresponding piperidones, methanol, ethanol and mixtures of dialkylethers of polyethylene glycols.

A well-known commercial process uses an aqueous mixture of a chemical solvent, especially DIPA and/or MDEA, and a physical solvent, especially cyclotetramethylene-sulfone. Such systems show good absorption capacity and good selectivity against moderate investment costs and operational costs. They perform very well at high pressures, especially between 20 and 90 bara.

A further improvement of the above described mixed aqueous systems using both types of solvents is desired. In order to improve the liquid/gas ratio, especially at high pressures and/or deep carbon dioxide removal, it has now been found that the addition of primary or secondary amine compounds in relatively small amounts further improves the process. For instance, the addition of a few wt % of piperazine results in a clear improvement of the kinetics of the system, resulting in a lower liquid/gas ratio, which may result in a smaller design of the plant (absorber as well as regenerator). When using the same liquid/gas ratio an, often considerable, larger amount of carbon dioxide may be removed.

In addition, in the case of addition of suitable primary or secondary amine compounds in relatively small amounts more carbon dioxide may be flashed at a relatively high pressure when compared with similar, aqueous chemical absorbents. This reduces re-compression requirements, e.g. for re-injection. This holds especially for the combination of DEA, TEA, DIPA and MDEA, especially DIPA and MDEA, and piperazine.

It has been described in the literature that the addition of e.g. piperazine to e.g. MDEA results in an improved acid gas removal. However, one particular disadvantage of such a combination is that carbamates may be formed, especially at high solvent loadings, which carbamates are insoluble in aqueous solutions, see e.g. U.S. Pat. No. 4,336,233. Thus, only limited amounts of primary or secondary amine compounds can be used in purely aqueous solutions. It is advised, therefore, not to use physical solvents in order to avoid the formation of the insoluble carbamates. It has, however, now surprisingly been found that such limitations do not occur in water/tetramethylenesulfone mixtures as applied in the usual commercial applications. In addition, degradation and corrosivity of these mixtures are very acceptable.

The present invention, therefore, relates to a process for the removal of carbon dioxide and optionally hydrogen sulphide and/or COS from a gas stream containing these compounds by washing the gas with an aqueous washing solution containing between 15 and 45 parts by weight based on total solution, preferably between 15 and 40 parts by weight, of water, between 15 and 40 parts by weight based on total solution of sulfolane and between 30 and 60 parts by weight based on total solution of a secondary or tertiary amine derived from ethanol amine, the amounts of water, sulfolane and amine together being 100 parts by weight, the process being carried out in the presence of a primary or secondary amine compound in an amount between 0.5 and 15 wt %, preferably between 0.5 and 10 wt %, based on water, sulfolane and amine.

When compared with a prior art process, i.e. the same process without the additional use of a primary or secondary amine compound, especially a secondary amine compound, one or more of the following advantages are obtained: the carbon dioxide absorption rate is faster, the loading amount is higher, the solvent/gas ratio is lower, the design of the plant is smaller and the regeneration heat requirement is lower (resulting is less cooling capacity). When compared with another prior art process, i.e. an absorbent containing aqueous amines, especially DMEA and piperazine, the addition of sulfolane results in the possibility to produce carbon dioxide at intermediate pressures, e.g. pressures between 3 and 15 bara, preferably between 5 and 10 bara.

The gases to be treated in the process according to the present invention may be synthesis gas, obtained for instance by (catalytic) partial oxidation and/or by steam methane reforming of hydrocarbons, e.g. methane, natural or associated gas, naphtha, diesel and liquid residual fractions, gases originating from coal gasification, coke oven gases, refinery gases, hydrogen and hydrogen containing gases, and is especially synthesis gas or natural gas.

The amounts of acidic gaseous compounds may range from a few tenth of a percent up to 70 or even 80 vol % of the total gas stream. Suitably the amount of carbon dioxide is between 1 and 45 mol %, preferably between 5 and 25 mol %, the amount of hydrogen sulphide is between 0 and 25 mol %, preferably between 0 and 10 mol %, and the amount of COS is between 0 and 2 mol % (all % based on total gas stream).

In the aqueous absorbent in the present process the amount of water is preferably between 20 and 45 parts by weight, the amount of sulfolane is preferably between 20 and 35 parts by weight and the amount of amine is preferably between 40 and 55 parts by weight, the amounts of water, sulfolane and amine together being 100 parts by weight. The preferred ranges results in optimum carbon dioxide removal in most cases.

The amine derived from ethanol amine may be a single secondary or tertiary amine derived from ethanol amine or mixtures of secondary amines and/or tertiary amines.

Suitable amines are secondary amines derived from ethanol amine which ethanol amine may or may not be substituted at one or both carbon atoms. Preferably the ethanol amine is not substituted or substituted at one carbon atom. Suitable substituents are $C_{1-4}$ alkyl groups, preferably methyl or ethyl groups, more preferably methyl. The amine group is substituted by a $C_{1-4}$ alkyl group, which group is optionally substituted by a hydroxyl group. Preferred amine substituent groups are methyl, 2-(1-hydroxyethyl) and 1-(2-hydroxypropyl). Very suitable amines are DIPA, DEA or MMEA, preferably DIPA.

Another group of suitable amines are tertiary amines derived from ethanolamine which ethanolamine may or may not be substituted at one or both carbon atoms. Preferably the ethanolamine is not substituted or substituted at one carbon atom. Suitable substituents are $C_{1-4}$ alkyl groups, preferably methyl or ethyl groups, more preferably methyl. The second substituents may be chosen from the same group as the first substituent. The third substituent of the amine group is a $C_{1-4}$ alkyl group, which group is optionally substituted by a hydroxyl group. Preferred amine substituent groups are methyl, 1-(2-hydroxyethyl) and 1-(2-hydroxypropyl). Very suitable amines are MDEA or DEMEA, preferably MDEA.

The primary or secondary amine compound has suitably a pKb (at 25° C. in water) below 5.5, preferably below 5, more preferably below 4.5. A lower pKb results in improved process results in the form of increased $CO_2$ absorption.

The primary or secondary amine compound to be added to the absorption solution suitably reacts faster with carbon dioxide under the same conditions than the amine reacts with carbon dioxide. Preferably the primary or secondary amine compound reacts at least twice as fast with carbon dioxide then the amine reacts with carbon dioxide, the reaction velocity being defined as the reaction velocity constant (at 25° C.). More preferably the primary or secondary amine compound reacts five times as fast as the amine, still more preferably reacting twenty times as fast as the amine. It is preferred to use in the case of a secondary amine a primary amine compound, and in the case of a tertiary amine a primary or secondary amine. Very suitable compounds are piperazine, methyl ethanol amine, or (2-aminoethyl)ethanol amine, especially piperazine.

The amount of primary or secondary amine compound will usually be between 0.5 and 15 wt % based on water, sulfolane and amine, preferably between 1 and 10 wt %, more preferably about 4 wt %.

The amount of primary or secondary amine compound is suitably at least 0.8 mol/l, especially between 1.0 mol/l and 3.0 mol/l, more especially between 1.0 mol and 3.0 mol/l, especially piperazine. For the specific combination of MDEA and piperazine a preferred embodiment is the use of 0.7-0.9 mol/l of piperazine, especially 0.6-0.8 mol/l.

The process according to the present invention is suitably carried out at a temperature between 15 and 90° C., preferably at a temperature of at least 20° C., more preferably between 25 and 80° C., still more preferably between 40 and 65° C., and even still mote preferably at about 55° C. The process is suitably carried out at a pressure between 10 and 150 bar, especially between 25 and 90 bara.

The invention will usually be carried out as a continuous process, which process also comprises the regeneration of the loaded solvent.

The contacting of the gas mixture with the absorbent solvent is well known in the art. It is suitably carried out in a zone having from 5-80 contacting layers, such as valve trays, bubble cap trays, baffles and the like. Structured packing may also be applied. The amount of $CO_2$ removal can be optimised by regulating the solvent/gas ratio. A suitable solvent/gas ratio is from 1.0 to 10 (w/w), preferably between 2 and 6. The loaded solvent may contain beside $CO_2$ and optionally $H_2S$ and/or COS appreciable amounts of other compounds from the gas mixture to be purified, e.g. hydrocarbons, carbon monoxide, hydrogen etc. It may be advantageous to remove these (non-acid) compounds at least partially from the loaded solvent by flashing to a pressure which is higher that the sum of the partial pressures belonging to the $CO_2$ and optionally $H_2S$ and/or COS. In this way only very small amounts of $CO_2$ and optionally $H_2S$ and COS are released from the solvent together with the (non-acid) compounds. The loaded solvent may advantageously flashed in a second step to a pressure which is below the partial pressures of $CO_2$ and optionally $H_2S$ and COS at the prevailing temperature. Usually the flash is carried out at a pressure between 1 and 15 bara, preferably between 1 and 10 bara, more preferably ambient pressure. In the gas set free during the flashing large amounts of the carbon dioxide and optionally $H_2S$ and/or COS are present.

The loaded solvent, optionally after flashing as described above is regenerated at a relatively high temperature suitably at a pressure between 1 and 2 bara. The regeneration is suitably carried out by heating in a regeneration column, suitably at a temperature between 70 and 150° C. The heating is preferably carried out with steam or hot oil. The lean absorbent solvent will be used again in the absorption stage described before. Suitably the lean solvent is heat exchanged with the loaden solvent.

The invention further relates to an absorbent solvent containing between 15 and 45 parts by weight based on total solution, preferably between 15 and 40 parts by weight, of water, between 15 and 40 parts by weight based on total solution of sulfolane and between 30 and 60 parts by weight based on total solution of a secondary or tertiary amine derived from ethanol amine, the amounts of water, sulfolane and amine together being 100 parts by weight and a primary or secondary amine compound in an amount between 0.5 and 15 wt % based on water, sulfolane and amine. The preferred individual compounds of the absorbent solvent and the ranges in the solvent are similarly defined as in the way as has been done for the process as described above.

EXAMPLE

A stream of natural gas comprising 11.9 vol % carbon dioxide was washed with an absorbent solution comprising 35 wt % MDEA, 18 wt % sulfolane and 43 wt % water. A commercially available standard absorber was used. At a liquid/gas ratio of 4.4, the carbon dioxide was removed until a level of 3.1 vol %. Addition of 1 wt % piperazine resulted in a further reduction of the amount of carbon dioxide ((1.7 vol %). Addition of another 1 wt % piperazine resulted in a further reduction of carbon dioxide (1.3 vol %).

A similar experiment as described above was done at a liquid/gas ratio of 3.1 and using 2 wt % piperazine. This resulted in a carbon dioxide level 1.9 vol %.

We claim:

1. A process for the removal of carbon dioxide from a gas stream containing carbon dioxide by washing the gas stream in an absorption zone having from 5-80 contacting trays with an aqueous washing solution, at an aqueous washing solution to gas ratio of between 2 and 6 (weight/weight), said aqueous washing solution containing between 20 and 45 parts by weight water, between 20 and 35 parts by weight sulfolane and between 40 and 55 parts by weight of an amine selected from the group of amines consisting of MEA, DEA, TEA, DIPA and MDEA, wherein the parts by weights are based on the amounts of water, sulfolane and amine together being 100 parts by weight, and, further, wherein the aqueous washing solution contains piperazine in an amount of from 0.7 mol/l to 0.9 mol/l, thereby obtaining an aqueous washing solution loaded with carbon dioxide, and a purified gas stream having a substantially reduced concentration of carbon dioxide, said carbon dioxide loaded aqueous washing solution being substantially free of insoluble carbamates.

2. The process of claim 1, wherein the gas stream is natural gas or synthesis gas.

3. The process of claim 2, wherein the gas stream includes an amount of carbon dioxide that is between 1 and 45 mol %, an amount of hydrogen sulphide that is between 0 and 25 mol %, and an amount of COS that is between 0 and 2 mol % (all % based on total gas stream).

4. The process of claim 3, wherein the aqueous washing solution includes an amount of water that is between 20 and 45 parts by weight, an amount of sulfolane that is between 20 and 35 parts by weight, and an amount of the amine that is between 40 and 55 parts by weight, wherein the parts by weights are based on the amounts of water, sulfolane and amine together being 100 parts by weight.

5. The process of claim 4, wherein the piperazine is present in the aqueous washing solution in an amount in the range of from 0.6 to 0.8 mol/l.

6. The process of claim 5 wherein the process is carried out at a temperature of at least 20° C.

7. The process of claim 6, wherein the process also comprises a regeneration of the loaded solvent.

8. The process of claim 7, wherein the process is carried out at a pressure between 25 and 90 bara.

9. An absorbent liquid containing between 20 and 45 parts by weight water, between 20 and 35 parts by weight sulfolane and between 40 and 55 parts by weight of an amine selected from the group of amines consisting of MEA, DEA, TEA, DIPA and MDEA, wherein the parts by weights are based on the amounts of water, sulfolane and amine together being 100 parts by weight, and, further, wherein the aqueous washing solution contains piperazine in an amount of from 0.7 mol/l to 0.9 mol./l, and wherein said absorbent liquid after absorption of carbon dioxide is substantially free of insoluble carbamates.

10. The absorbent liquid of claim 9, wherein the piperazine is present in the aqueous washing solution in an amount in the range of from 0.6 to 0.8 mol/l.

11. The absorbent liquid of claim 10, wherein the amine is MDEA.

12. The process of claim 1, wherein carbon dioxide is produced at an intermediate pressure of between 3 and 15 bara.

13. The process of claim 1, wherein the amine in the aqueous washing solution is DIPA.

14. The absorbent liquid of claim 9, wherein the amine is DIPA.

15. The process of claim 12, wherein carbon dioxide is produced at an intermediate pressure of between 5 and 10 bara.

* * * * *